June 30, 1931.  T. R. BRUMFIELD  1,812,319
NUT LOCK
Filed Feb. 1, 1930  2 Sheets-Sheet 1
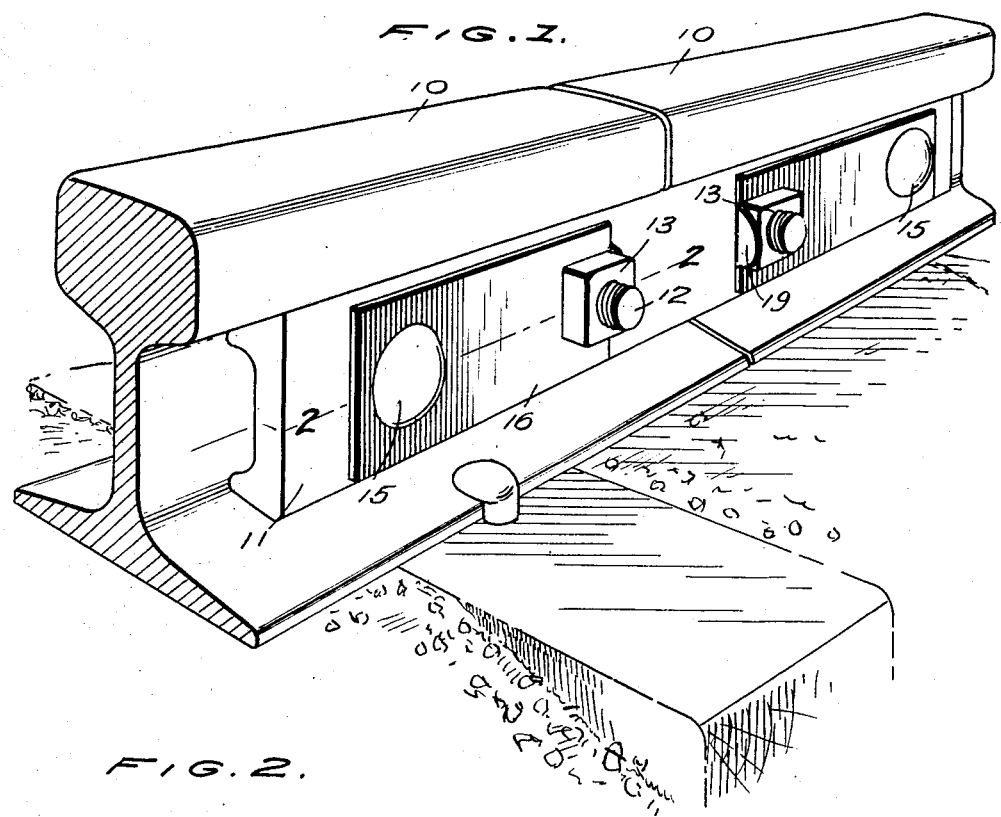
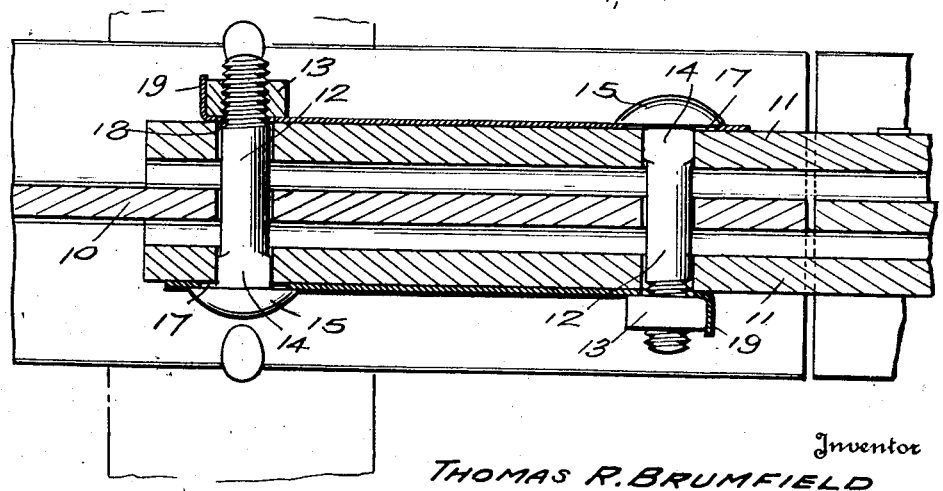
Inventor
THOMAS R. BRUMFIELD
By John O. Lind
Attorney June 30, 1931. T. R. BRUMFIELD 1,812,319
NUT LOCK
Filed Feb. 1, 1930 2 Sheets-Sheet 2
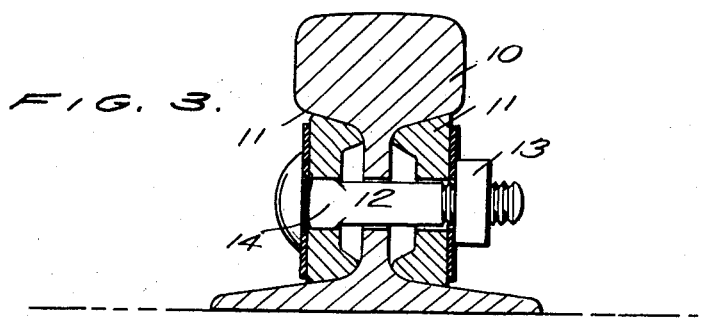
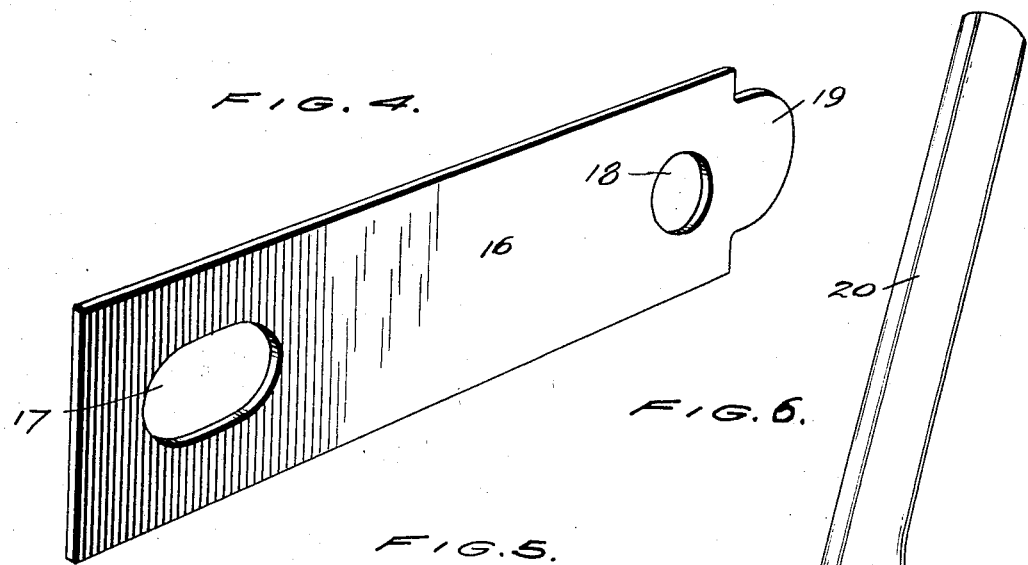
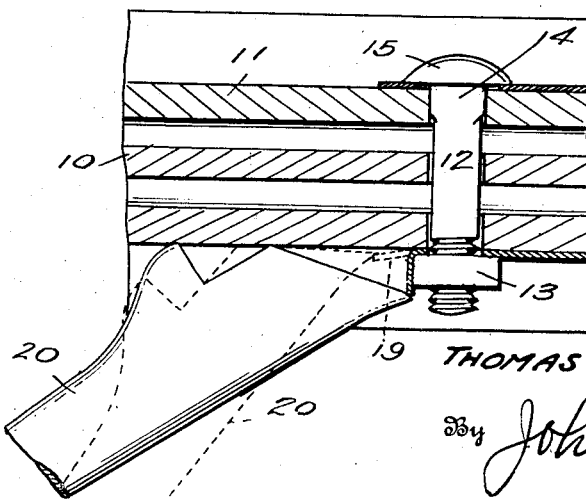
Inventor
THOMAS R. BRUMFIELD
By John O'hind
Attorney Patented June 30, 1931

1,812,319

UNITED STATES PATENT OFFICE

THOMAS ROBERT BRUMFIELD, OF DANVILLE, VIRGINIA

NUT LOCK

Application filed February 1, 1930. Serial No. 425,230.

This invention relates to nut locks and it is a principal object of the invention to provide a nut lock especially adapted for the bolts and nuts upon fish-plates and the like.

In devices of this type the bolts are generally positioned so as to extend in opposite directions and it is an important feature of this invention to provide means which will at the same time prevent rotation of a bolt and also prevent unlocking of the nut upon the adjacent bolt.

It is also an object to provide means whereby the lock can be easily and quickly applied.

With these and other objects in view as will hereinafter appear, this invention consists in the construction, arrangement and combination of the various parts of the device, whereby the objects contemplated are attained, as hereinafter more fully set forth, pointed out in the appended claims, and illustrated in the accompanying drawings, in which:

Figure 1 is a perspective view of the joint between two rails and with the fish-plates thereon with the locking device in locked position, Figure 2 is a cross sectional view upon the line 2—2 of Figure 1, Figure 3 is a vertical cross sectional view with the bolt and nut shown in elevation, Figure 4 is a perspective view of the locking plate, Figure 5 is a partial horizontal cross sectional view showing the manner in which the locking device is adapted to be bent against the side of a nut, and Figure 6 is a perspective view of a preferred type of tool for locking the nut lock.

In the drawings like reference characters refer to like parts.

Referring to the drawings, the abutting rails are indicated at 10 with the fish-plates shown at 11. The bolts 12 are arranged in alternate relation as shown and are provided with the customary nuts 13. The bolts generally used are of that type in which the shanks thereof are provided with oval shaped portions 14 adjacent the heads 15 of the bolts.

A locking plate 16 is provided of a peculiar construction in which at one end is an oval shaped aperture 17 which is adapted to cooperate with the oval shaped portion 14 of the bolt shanks to prevent rotation of the bolts, and the other end of the plate 16 is provided with a circular aperture 18 slightly larger than the cross section of the threaded ends of the bolts so that the same may pass freely therethrough.

The entire plate 16 is of substantially rectangular construction, although this form may be slightly modified if desired. At the side adjacent the aperture 18 a semi-circular tab or projection 19 is provided which is adapted to be bent up against the side of a nut 13 after the nut has been threaded upon the bolt so as to clamp the fish-plates in position. For forcing the tab 19 into locking position a peculiarly shaped lever or tool 20 is used, shown particularly in Figure 6, and the operation thereof is shown in Figure 5, in which the full lines indicate the position of the tool after the tab 19 has been bent into position while the dotted lines indicate the preliminary position of the tool, and also the initial position of the locking tab 19.

The operation of the device is as follows. After the fish-plates have been assembled, the plates 16 are placed in position and then the bolts are threaded through the aligned apertures in the fish-plates and rails so that the oval portion 14 will cooperate with the oval shaped aperture 17 in each plate 16. The nuts 13 are then threaded so as to clamp the fish-plates against the web of the rails and finally the tab 19 is bent up against the side of a nut 13 with the tool 20, and thereby the entire assembly is maintained in locked position.

The locking device is peculiarly effective, and all parts of the same are fixed positively in locked position so that the various elements will withstand any vibration to which they may become subject. This locking device will eliminate to a great degree the frequent tightening of the bolts upon the fish-plates. However, should it become necessary to tighten the bolts due to a lengthening of the bolt shanks, the tab 19 can be easily bent back to its original position and the nut tightened and then bent back into the locked position. The plate 16 is made of any material which is sufficiently flexible, and has enough rigidity for the purpose designed, such as copper. It will be noted particularly that the plate 16 will lock the nut upon one bolt while at the same time locking the adjacent bolt from turning. Since the plates are placed upon each side of the rails each bolt therein is locked from turning, and also has the nut thereon locked from unlocking.

Some changes may be made in the construction and arrangement of the invention above set forth, without departing from the real purpose and spirit thereof, and it is the intention to cover by the following claim, any modified forms of structure or use of equivalents, which may be reasonably included within their scope.

I claim:

A nut lock for fish-plates and the like in which the bolts extend in opposite directions comprising a plate of rectangular configuration having two spaced apertures therein, one of said apertures being of oval shape so as to secure a bolt having an oval portion from turning and the other of said apertures being round and of sufficient size to allow the threaded end of a bolt to pass freely therethrough and a flexible tongue upon the end of said plate adjacent said round aperture and said tongue being adapted to be bent against the side of a nut to keep the same from turning.

THOMAS ROBERT BRUMFIELD.